Dec. 26, 1933.   C. E. EVERETT ET AL   1,940,851
CORN HARVESTER
Filed July 30, 1932   7 Sheets-Sheet 1

INVENTORS
Charles Edward Everett
Charles H Taylor
BY
ASKrot
ATTORNEY

Dec. 26, 1933.  C. E. EVERETT ET AL  1,940,851
CORN HARVESTER
Filed July 30, 1932  7 Sheets-Sheet 2
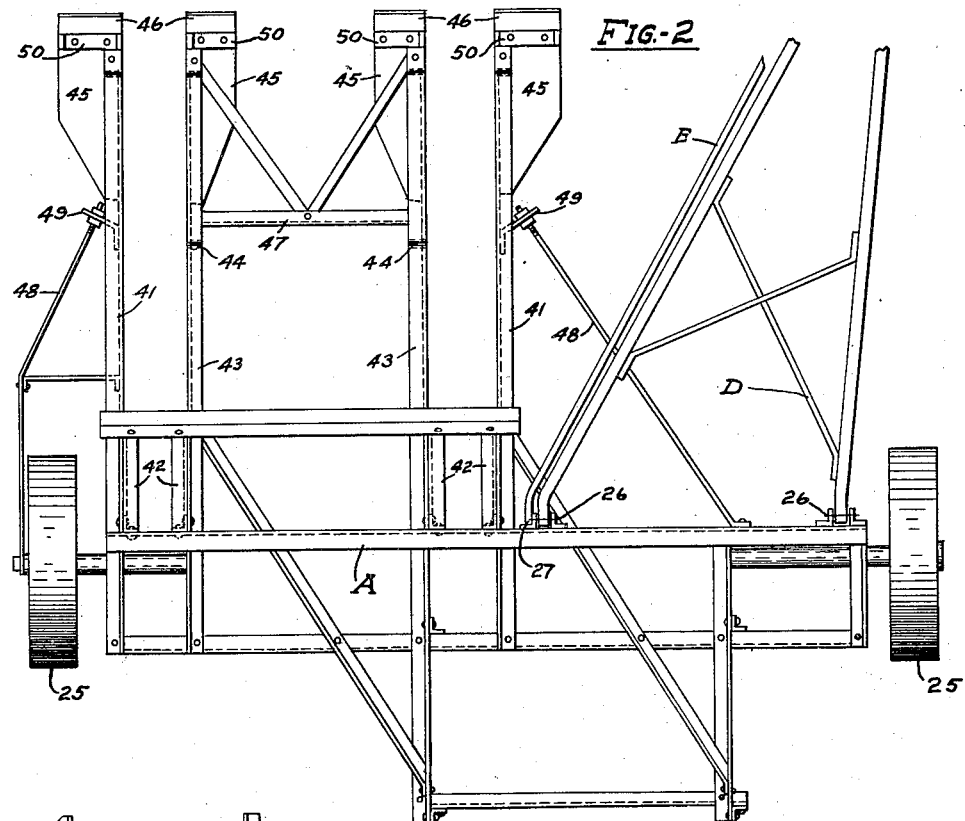
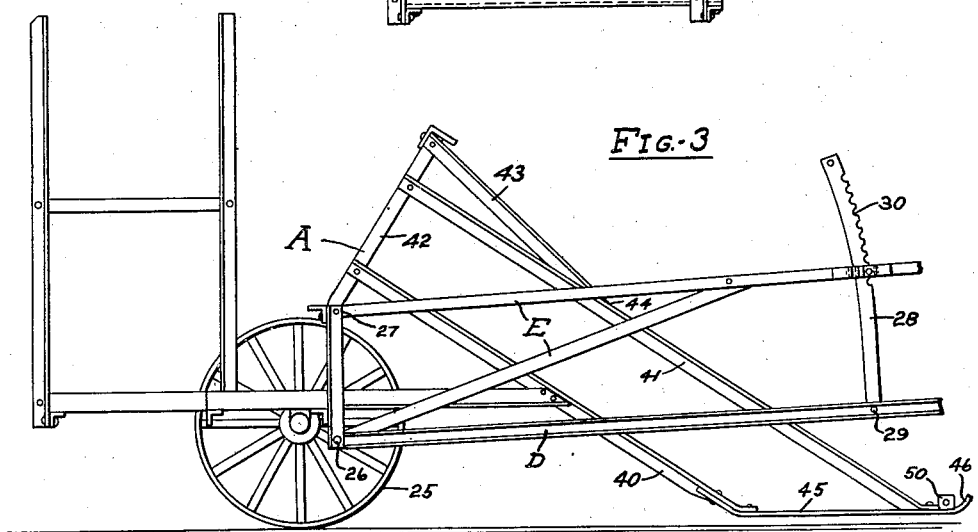
INVENTORS.
Charles Edward Everett
Charles H Taylor
BY
AS Krotz
ATTORNEY

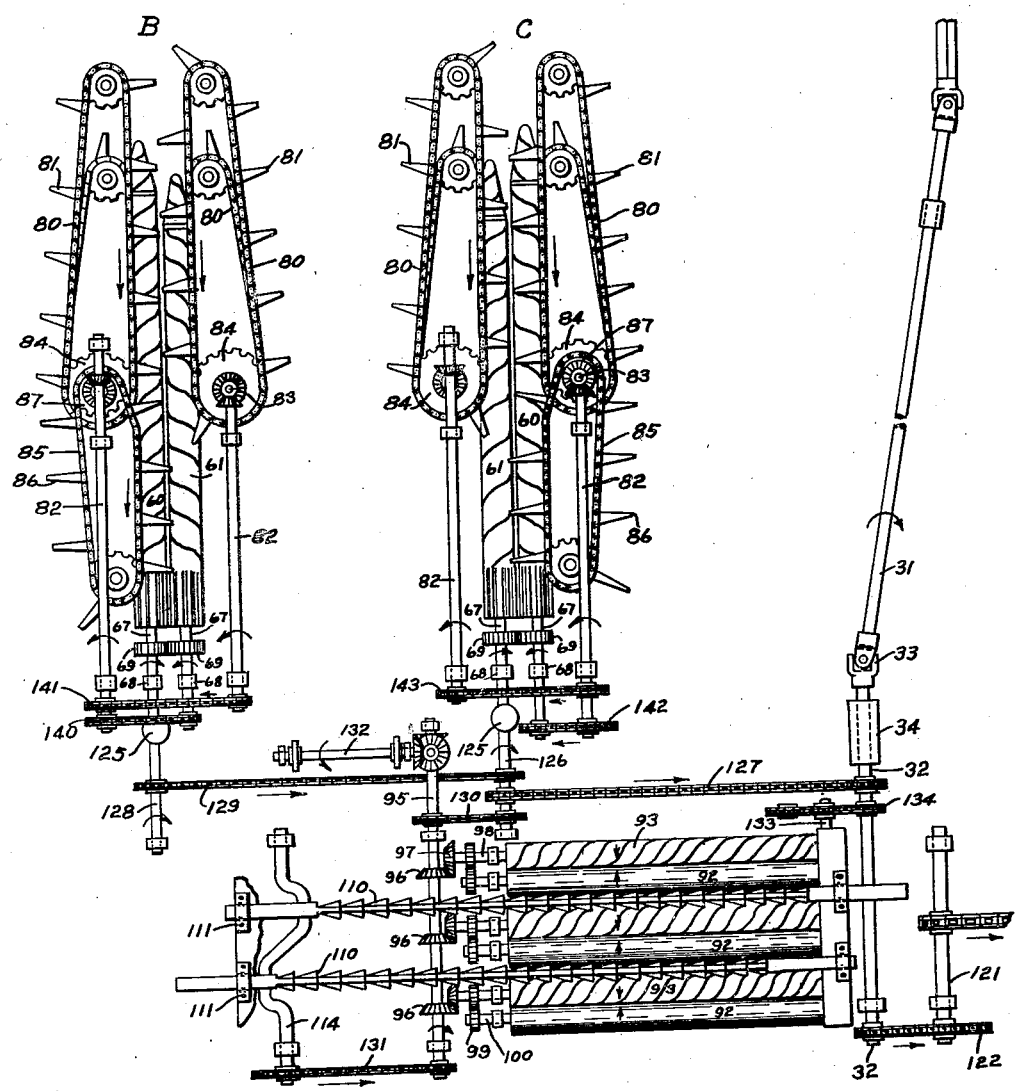

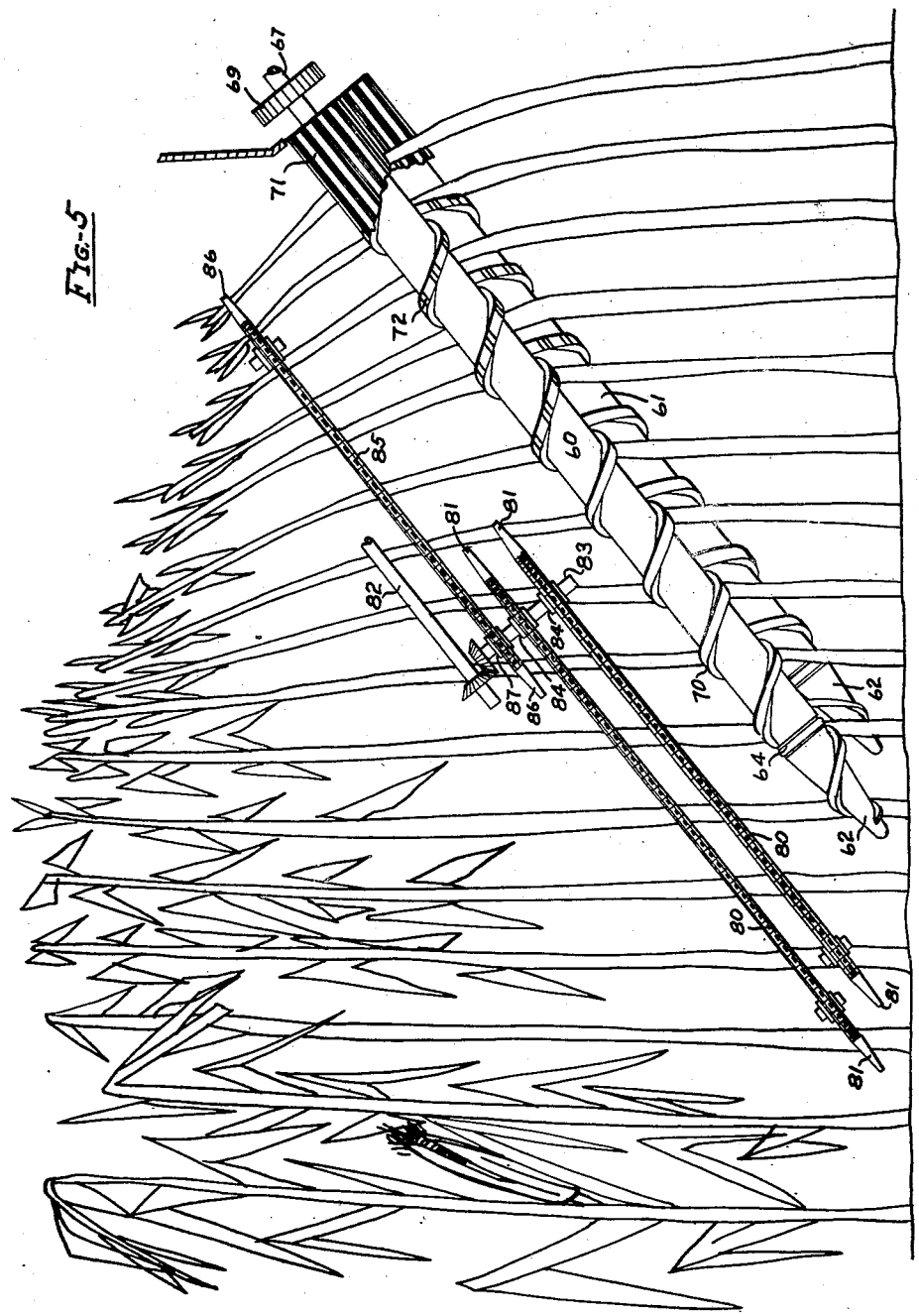

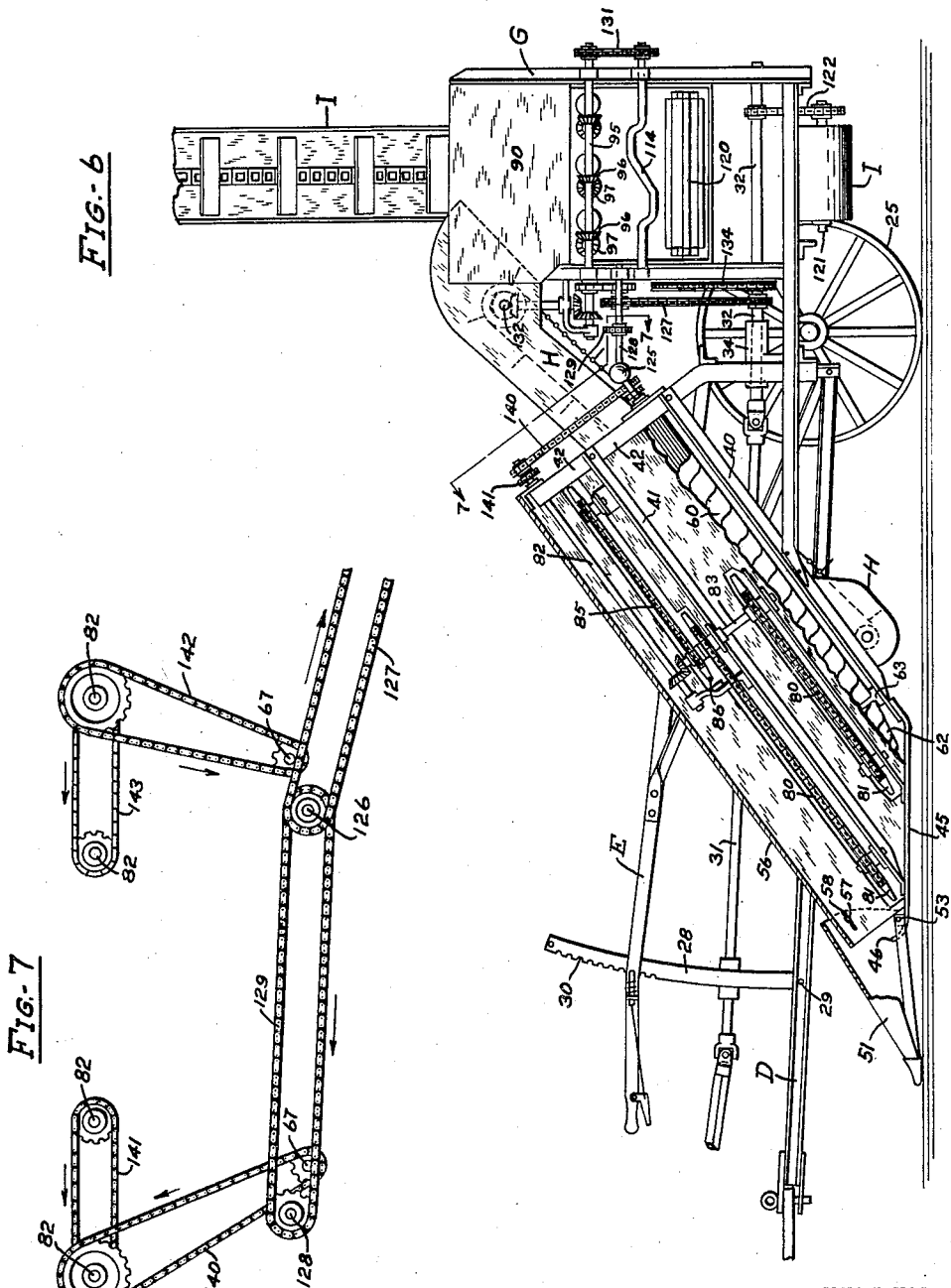

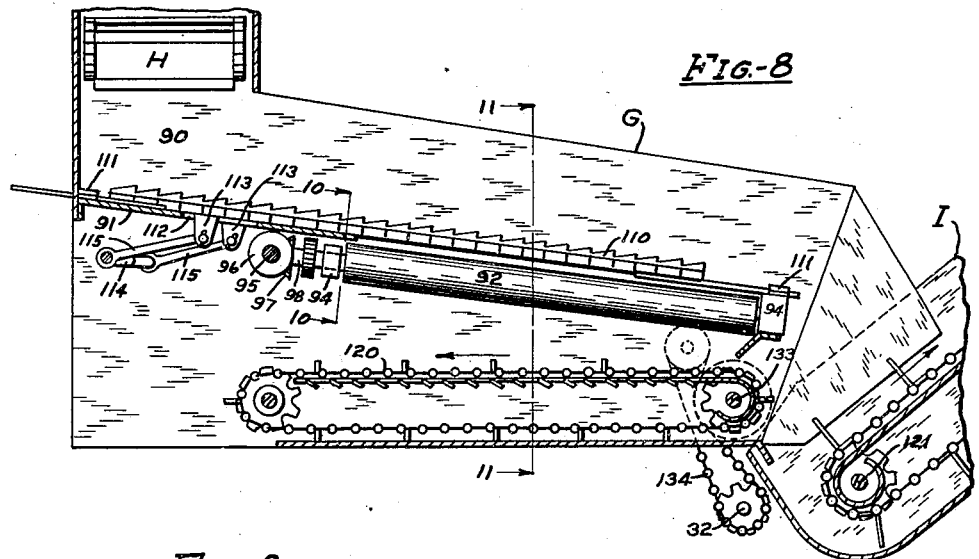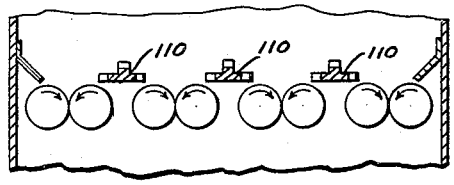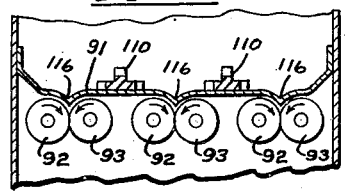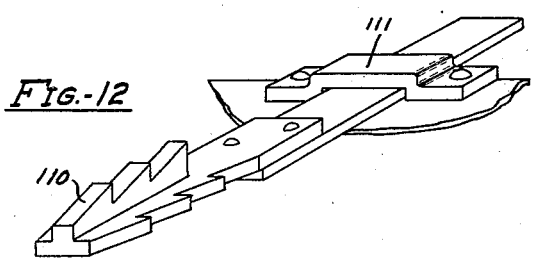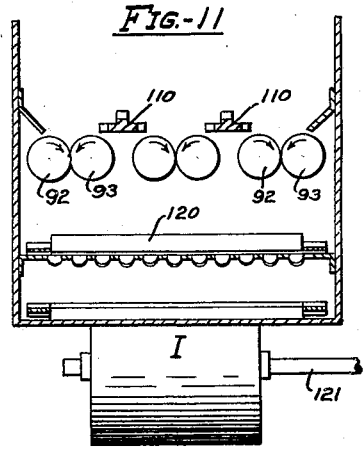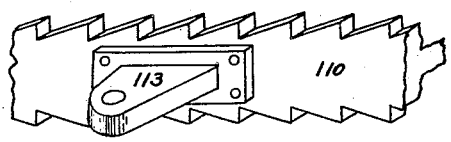

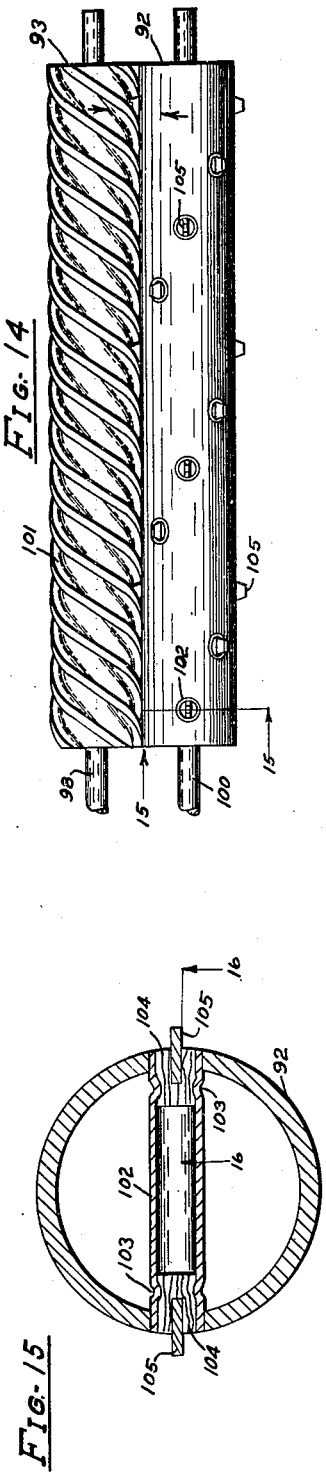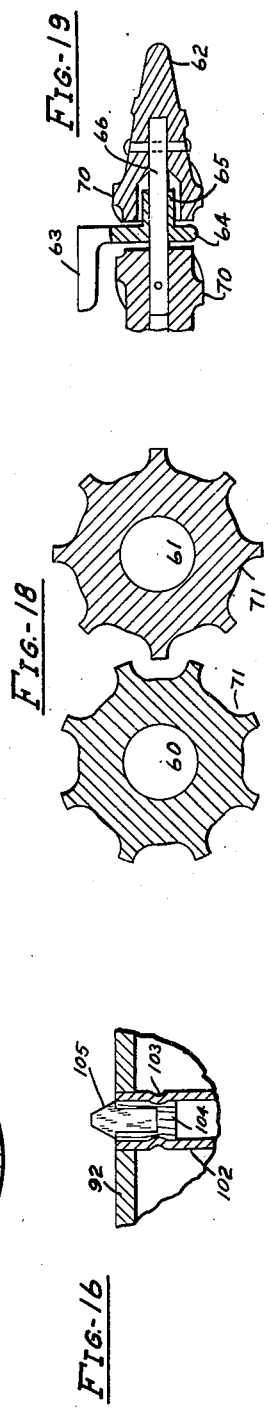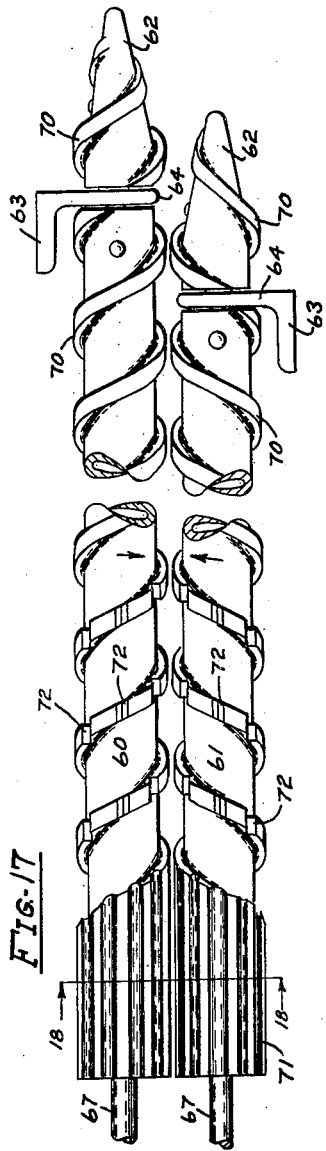

Patented Dec. 26, 1933

1,940,851

UNITED STATES PATENT OFFICE 1,940,851

CORN HARVESTER

Charles Edward Everett, Racine, Wis., and Charles H. Taylor, Chicago, Ill., assignors to The Massey-Harris Company, Racine, Wis., a corporation of Maryland Application July 30, 1932. Serial No. 626,676

5 Claims. (Cl. 56—18)

It is the intention that the present patent shall cover by suitable expression, in the appended claims, features of patentable novelty other than claimed in my divisional application bearing filing date of January 13, 1933 and Serial No. 651,644.

Our invention relates to corn harvesters designed to remove the ears of corn from the standing stalks in one operation and remove the husks from the ears by another operation, with instrumentalities cooperating whereby the ears are moved from the first operating unit to the second and then delivered to any desired receptacle.

Our invention seeks to provide a simple, compact, light, easily operated machine which can be made in either one or two row capacity and adapted to be pulled and powered by means of a tractor or otherwise.

An object of our invention is to separate all of the ears from the stalks and all of the husks from the ears in such a manner as to maintain the ears intact without mutilating and without removing any of the kernels.

The particular object of our invention is to provide a corn harvester which will operate successfully without the necessity of changing any of the parts when operating under varying field conditions, such as extremely dry and brittle or extremely damp and tough stalks, ears and husks, or where the corn is standing or badly lodged.

It is also an object to provide certain details and features of construction and combination of parts, tending to increase the general efficiency and convenience of operation of a corn harvester of this general construction.

The invention resides in certain novel features which will be pointed out in the claims and shown in the accompanying drawings in which:

Figure 2 is a top view plan of the frame structure.

Figure 3 is a side view elevation of the frame structure.

Figure 4 is a diagrammatic top view, illustrating the location and arrangement of the various operating units and manner of driving the same.

Figure 5 is a diagrammatic view illustrating how the stalks are retarded as they pass through the rear half of the rolls.

Figure 6 is a side elevation of the harvester with the rear ground wheel and some other parts removed.

Figure 7 is an enlarged diagrammatic view illustrating the manner of driving the rolls and the gathering chains.

Figure 8 is a sectional side view of the husking unit, taken on line 8 of Figure 1.

Figure 9 is a sectional transverse view of a modification of the husking unit illustrating a unit comprising four pairs of rolls and three agitator bars.

Figure 10 is a transverse sectional view of the husking unit taken on line 10 of Figure 8.

Figure 11 is a transverse sectional view of the husking unit taken on line 11 of Figure 8.

Figure 12 is a fractional plan view of the agitator bars showing the manner of slidably supporting the ends thereof.

Figure 13 is a fractional plan view of the agitator bars showing the bracket by means of which the bar is operatively connected to the crankshaft.

Figure 14 is a top plan view of a pair of husking rolls.

Figure 15 is a sectional view of the smooth husking roll taken on the line 15 of Figure 14.

Figure 16 is a fractional sectional view taken on line 16 of Figure 15 showing the husking peg and its fastening, taken on line 16 of Figure 15.

Figure 17 is a top plan view of a pair of snapping rolls.

Figure 18 is a sectional view of the snapping rolls taken on line 18 of Figure 17.

Figure 19 is a fractional sectional view of the front end of the snapping rolls showing details of the bearing and manner of attaching the conical point to the snapping rolls.

Similar reference characters and numerals designate corresponding parts in the various figures of the drawings.

Figure 1:
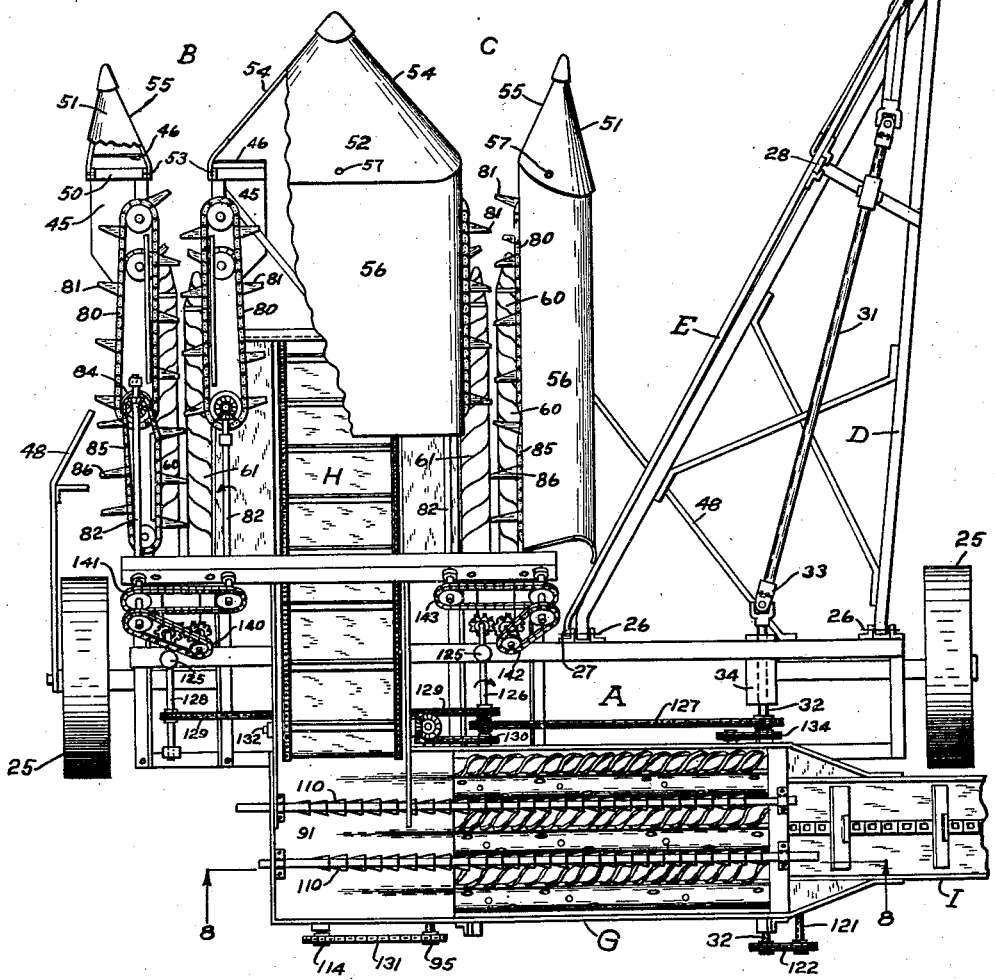
Figure 1 is a top view plan illustrating the general arrangement of the mechanism embodying our invention.

In constructing a corn harvester embodying our invention, we provide a main frame structure which may be any detail form. A preferable form is shown in Figures 2 and 3 which is designated in its entirety by the reference character A. The frame shown is adapted to carry a two row equipment, that is, the harvester in the form shown is designed to harvest two adjacent rows of corn simultaneously. This frame is, for convenience in design, positioned transverse to the direction of travel and is equipped at its ends with carrying wheels 25.

To one side of the frame A, as indicated in Figure 1, are secured two forwardly and downwardly extended gathering units designated in their entirety by reference characters B and C. To the other side of the frame is secured a tractor draft structure designated in its entirety by the reference character D. This structure is hingedly attached as at 26, thereby providing a widely spaced apart hinged connection. One hinge near the center of the frame and the other at the end thereof.

A lever structure designated in its entirety by reference character E, is rigidly attached to the frame A as at 27, thereby providing a rigid, spaced apart lever connection to the frame A and near the center thereof.

A lever anchor 28 is made fast at its bottom end to the draft structure D as at 29. Notches 30 are provided at the top front edge of this anchor, thereby to provide means for locking the lever structure E in any desired position by means of the usual hand operated latch. The usual means, not shown, for locking this latch out of engagement is also provided whereby the harvester may be operated "floating" in a manner which will hereinafter appear. The mechanism for locking the lever and latch and the purpose of same is well known in the art, for which reason a more detailed description is unnecessary.

As thus constructed it will be seen that provisions are made whereby our improved corn harvester may be pulled and powered by a tractor. That the lever E will be within reach of the tractor operator, whereby the frame structure may easily be tilted on the axis of the carrying wheels 25 and locked in any desired position, or operated "floating" when so desired. It will be understood that when the frame A is tilted on its axis it is for the purpose of raising or lowering the front ends of the gathering units B and C.

As previously indicated, the present invention contemplates either a one or two row machine for which power may be derived from any suitable source. The operating means for the form shown includes a tractor F, a fraction only of which is shown, equipped with what is commonly termed a "Power take-off". For this purpose we provide a propeller shaft 31 which is operatively connected to the shaft 32 by means of universal joint 33. Shaft 32 is journaled in bearing housing 34. The manner of supplying power from this shaft to the various units of the harvester will hereinafter appear.

Referring to Figure 1, it will be observed that the gathering units B and C each consist of two halves, spaced apart, forming a stalk-way between each half. A pair of snapping rolls is rotatably mounted in this stalk-way in a manner which will hereinafter appear.

The frame structure of the outer half of the gathering units as indicated in Figures 2 and 3 consists of a lower angle bar 40 and an upper angle bar 41. These bars are in parallel relation, the rear ends of which are made fast to frame members 42 as clearly indicated in Figure 3. The frame structure of the inner half of each gathering unit is similar to the outer half differing only in that the upper angle bar 43 is bent as at 44 whereby the rear end can be made fast to the extreme upper end of member 42, thus giving additional strength to the frame and providing more room under the rear end of bar 43 for the ears to pass from the snapping rolls to the elevator as will hereinafter appear.

The lower ends of bars 40 are made fast to the lower ends of bars 41 and 43 by means of runners 45, the front ends of which are curved upward as at 46, thus forming a runner on which the gathering units may rest and float or ride over the ground when so desired.

The front end of the inner halves of the gathering units are connected by means of cross bar 47 and otherwise securely fastened as will hereinafter appear.

The lower angle bars 40 on their inside surfaces each rotatably support the front end of a snapping roll in a manner which will hereinafter appear.

It has been found in practice that the outer half of each gathering unit needs an adjustable brace whereby the outer snapping rolls may be set to operate in contact with its companion roll or spaced apart at their front ends. For this purpose we provide braces 48, each adapted to adjustably engage brackets 49 as indicated in Figure 2.

On the front top surface of runners 45 and in rear of the curved end 46 we mount brackets 50 which form a pivotal support for the gathering snouts 51 and 52 as at 53.

Snouts 51 and 52 each having inside surfaces 54 and 55 which incline from their points rearwardly and inwardly thereby cooperating to provide a converging mouth for the gathering units thereby to more readily receive and deliver the stalks into the zone of operation of the gathering chains and snapping rolls, a description of which will hereinafter appear.

Each half of the gathering units is provided with the inside sheet metal guards 56. The sheet metal guards on the snouts 51 and 52 overlap the guards 56 as indicated in Figure 6 so as not to catch the stalks as they slide back over the snouts and on guards 56 as already indicated. The snouts 51 and 52 are hingedly mounted as at 53. Their points are slightly rounded whereby they will slide over the ground and under lodged stalks.

A bolt 57 is made fast to the snout guard, the extended end of which passes through the slot 58 as illustrated in Figure 6. Thus the snouts will be limited in their movement by the slot 58.

The ear detaching means comprises mainly a pair of snapping rolls 60 and 61 operatively geared together so their adjacent surfaces move downward whereby the stalks are engaged and move rearwardly and downwardly therebetween, and when the ears encounter the rolls they are pinched or snapped off the stalks.

The outer roll 60 of each pair is positioned on a higher plane than the inner roll 61. Roll 60 is therefore longer than roll 61 whereby the ends of their conical points 62 will be on the same plane. As already indicated, the pair of rolls are rotatably positioned in the stalkway. Our invention comprises the peripheral shape of these rolls and the manner of assisting the stalks during their passage between the rolls.

It will be observed that the rolls are each constructed in two sections. We rotatably mount the front end of each roll to members 40 by means of bracket 63 having a projecting spacer plate 64 which is provided with an integral bearing 65. The shaft 66 is rotatably journaled in bearing 65 intermediate its length. The rearwardly extending end is made fast to the front end of the rolls 60 and 61. The forwardly extending end is made fast to the conical point 62.

The rear ends of rolls 60 and 61 are provided with shafts 67 which are rotatably journaled in bearings 68. These bearings are suitably mounted on members 42. Gears 69 are made fast to the shaft 67 and are similar whereby the rolls must turn in opposite directions and at exactly the same speed and in the direction indicated by arrows in Figure 17.

The rolls 60 and 61 and the conical points 62 are provided with a plurality of spiral projections 70 extending from the front end of conical point 62 to within a short distance of the rear end of the rolls. These spiral projections are of opposite hand as indicated in Figure 17. The rolls shown in Figure 17 are adapted to operate in the gathering unit B in which case roll 60 is turned clockwise and roll 61 is turned anti-clockwise when viewed from the rear. Roll 60 is therefore provided with right hand spirals when facing the rear end and roll 61 is provided with left hand spirals. The spirals therefore turn in unison and tend to move the stalks rearwardly. It will be seen that this order of things is carried out on the conical points as well as on the rolls proper, whereby the spacer plate 64 will not seriously interfere with the spirals in their tendency to move the stalks rearwardly because the adjacent spiral will carry the stalks past the space occupied by the spacer plate.

Longitudinal grooves 71 are evenly spaced on the perimeters of the rear end of each roll extending from the groove formed by the spirals 70 to the end of the rolls.

The grooves 71 are adapted to turn in alternate position as indicated in Figure 18, the number and shape of the grooves being such as will provide a zig-zag passage for the stalks thereby to grip the stalks in a manner which will insure their speedy passage between the rolls. It will be seen that the space between the projection formed by these grooves and the bottom of the adjacent groove is about the same as the space between the adjacent edges of the projections, thereby forming a multiple of gripping surfaces.

In general, it may be stated that a majority of ears are removed from the stalks before they get very far past the center of the rolls. Smooth spiral projections will shell less corn than notched projections. However, with smooth spirals the full length of the rolls too many stalks would reach the rear and clog. We therefore provide notches 72 in the spirals for about one-third the length of the rolls and at the rear end thereof thereby to more firmly grip the stalks and speed their downward movement. Generally speaking, all ears will be removed before the stalks reach the longitudinal grooves, therefore the major object of these grooves is to positively and quickly move anything that might collect and clog the stalk passage at the rear end.

One of the novel features of our invention is the means we provide whereby to speedily remove the ears from the stalks by means of our improved snapping rolls. To more fully accomplish this end under all conditions, we provide a suplementary gathering chain which cooperates with the snapping rolls.

We supply the usual gathering chains 80 which extend over the front ends of the snapping rolls for about one-half their length. These chains are supplied with stalk engaging lugs 81 and are operatively connected to shafts 82 by means of shaft 83, a pair of bevel gears and sprockets 84 in a manner well known and clearly indicated in Figures 1—4—5 and 6. The gathering chains are geared to travel at slightly better than ground speed. The lugs 81 will therefore contact with the stalks and thereby move and hold them in a substantially vertical position as they pass between the front ends of the rolls.

The secondary chain 85, one only of which is preferably provided for each gathering unit, is supplied with stalk engaging lugs 86. The chain 85 is as indicated operatively connected to shaft 83 by means of sprocket 87. This sprocket 87 is considerably smaller than sprocket 84 whereby the lugs 86 will travel at a considerable less speed than the lugs 81. Therefore, when the stalks are released by lugs 81 and contact with lugs 86 they will be retarded as illustrated graphically in Figure 5.

It will be seen that normally the stalks in their rearward and downward passage between the snapping rolls will be acted upon in two stages. First, by the gathering chain lugs 81 and the smooth spiral projections 70 on the front ends of the snapping rolls and second, by the secondary chain lugs 86 and the notched spiral projections. And further, when conditions are severe and stalks are high, by a third and more severe means on the rear end of the rolls.

We provide a husking unit which is designated in its entirety by the reference character G. This unit includes, in its organization, a suitable hopper, retaining side walls, a plurality of pairs of husking rolls and other instrumentalities whereby the husks are removed from the ears and the ears delivered to a wagon box or any other suitable receptacle.

The receiving hopper and husking unit are positioned on an inclined plane as illustrated in Figure 8 whereby the ears tend to move toward the outlet end of the unit.

An ear elevator designated in its entirety by the reference character H is secured to and positioned between the inner halves of gathering units B and C. The front end is positioned low enough whereby the ears, after they are removed from the stalks, will fall into this elevator in a manner too well known to require further description.

The elevator H as illustrated in Figure 6 extends rearwardly and upwardly thereby to deliver the ears to the hopper 90, the bottom 91 of which extends a short distance over the rear end of the husking rolls 92 and 93 which are rotatably mounted in pairs as indicated in Figures 1—4—10 and 11. In each of these figures three pairs of rolls are shown as the preferable number. A modified form, however, is shown in Figure 9 wherein four pairs of rolls are used.

The husking rolls 92 and 93 are supported for rotation upon bearings 94 as shown in Figure 8. Generally each of the rolls 93 is driven direct by means of shaft 95 through bevel gears 96 and 97. Gear 97 is made fast to shaft 98. Gear 99 is also made fast to shaft 98. A similar gear 99 intermeshes gear 98 and is made fast to shaft 100 whereby rolls 92 are driven. In this organization it will be seen that rolls 93 will turn in opposite direction to rolls 92 and that rolls 93 are directly and individually driven by shaft 95 which turns in the direction indicated by arrow. Thus adjacent surfaces of the pairs of rolls will turn downward. Generally roll 92 is yieldably held in contact with roll 93 in a manner too well known to require further description or illustration.

One of the novel features of our invention is the form of the husking rolls. Roll 93 is provided with a plurality of spiral projections 101 of uniform height. As thus formed roll 93 turns clockwise when viewed from the rear. The spirals are therefore left hand for reasons which will hereinafter appear. Roll 92 is made from a tube having suitable end fillers in which to secure the carrying shafts. The peripheral surface of this roll is made smooth as shown. At suitable intervals we supply small tubes 102 securely pressed into suitably positioned openings whereby their ends will register with the groove formed by the spirals on roll 93. Tubes 102 are provided with depressions 103. Wooden plugs 104 are forced into the ends of tubes 102, the depressions 103 serving to hold them securely into position. Steel pegs 105 are driven into the plugs 104 and a short portion is left projecting above the peripheral surface of the roll.

The pairs of rolls are preferably spaced a short distance apart as indicated in the various figures and for the purpose of assisting in moving the ears from the hopper to and over the rolls we provide saw-toothed agitator bars 110. These bars are of an inverted T shape having three saw tooth edges as indicated. These agitator bars are positioned between each pair of rolls and rest on the hopper bottom 91 extending to within a short distance of the discharge end of the rolls. They are slidably supported at both ends on steel extension straps as at 111. The slot 112 is provided for the bracket 113 which is attached to the oscillating bar 110 and is operatively connected to the crank shaft 114 by means of connecting rods 115. The cranks on shaft 114 are preferably positioned at 180° as indicated in Figure 4 whereby the agitator racks 110 will oscillate alternately. However, when four pairs of rolls and three oscillating bars are used as illustrated in Figure 9 the two outside agitator bars are preferably operated in unison and the center bar alternately thereto. The hopper bottom 91 is provided with grooves 116 as indicated in Figure 10, thereby to assist the agitator bars in directing the ears to the rolls and parallel thereto.

As thus constructed it will be seen that as the ears fall into the hopper they will be agitated and soon fall between the agitator bars. In this position they will be moved to the rolls where the spiral projections will tend to cause them to revolve and continue toward the outlet end of the rolls. While the ears are revolving any loose ends of husks will be gripped between the rolls and removed. The small pegs 105 will tend to tear portions of the husks loose after which they will be similarly removed. Thus the spirals, agitators and pegs will cooperate to move the ears through the unit and deliver them with the husks removed into the wagon loading conveyor which in its entirety is designated by the reference character I, the operation and construction of which is too well known to require further description. The husks, stalks and any kernels loosened will be deposited on the waste conveyor 120 located beneath the husking rolls. This conveyor is adapted to discharge the husks and portions of stalks on the ground and deliver the kernels to the elevator I. In order to simplify this specification and more clearly illustrate the operation of our invention numerous arrows are used to indicate direction of rotation of shafts and direction of travel of chains. A distinct feature of our invention resides in the simple and novel means for driving all of the operating instrumentalities. By referring to the diagrammatic illustration in Figure 4 it will be seen that the shaft 32 extends rearwardly and drives the wagon box elevator shaft 121 by means of suitable sprockets and the chain 122.

Roll 61 on the right hand gathering unit is driven by means of universal joint 125 and horizontally positioned shaft 126 which is operatively connected to shaft 32 by means of chain 127 and suitable sprockets. Roll 60 on the left hand gathering unit is likewise driven through the shaft 67 by means of universal joint 125 and horizontally positioned shaft 128 which is operatively connected to shaft 126 by means of chain 129 and suitable sprockets.

Power is transmitted to shaft 95 from shaft 126 by means of suitable sprockets and chain 130. Crank shaft 114 is driven by shaft 95 by means of suitable sprockets and chain 131. Elevator shaft 132 is driven by shaft 95 through a pair of bevel gears in a manner which will be understood without further description.

The waste conveyor drive shaft 133 is driven by shaft 32 by means of suitable sprockets and reverse chain 134.

Shafts 82 preferably all turn in the same direction as indicated by arrows, each having suitable bearing supports and adapted to drive the gathering chain shafts 83 by means of bevel gears in a well known manner. Shaft 82 which drives the mechanism on the left half of unit B is driven from shaft 67 of roll 61 by means of suitable sprockets and chain 140. The right hand shaft 82 on unit B is driven by the left hand shaft 82 on this unit by means of suitable sprockets and chain 141. The shaft 82 on the right hand side of unit C is driven by the right hand shaft 67 by means of suitable sprockets and chain 142 and the left hand shaft 82 is driven by the right hand shaft 82 by means of suitable sprockets and chain 143.

Thus it will be seen that in the present invention all of the operating instrumentalities except the ear elevator H are driven by means of chains thus simplifying the construction and reducing the power required to a minimum.

It will of course be understood that changes in the proportions, forms and minor details of construction may be made without departing from the scope of our invention as covered by the appended claims.

We claim:—

1. In a corn harvester, the combination of a carrying frame, a pair of snapping rolls closely spaced in parallel relation rotatably mounted on said frame, said rolls each having spiral projections, but of opposite hand, extending from the front end of said rolls to within a short distance of the rear end thereof, means whereby adjacent spiral projections move in unison downwardly and rearwardly, longitudinal grooves in the perimeters of said rolls which extend from the rear end of said spiral projections to the rear end of said rolls, said longitudinal grooves positioned whereby they turn in alternate relation and having a shape to thereby form a substantially uniform zigzag opening through which the stalks are moved downward.

2. In a corn harvester, the combination of a carrying frame, a pair of snapping rolls closely spaced in parallel relation rotatably mounted on said frame, said rolls each having spiral projections, but of opposite hand, extending from the front end of said rolls to within a short distance of the rear end thereof, said spiral projections having at their rear ends a plurality of spaced apart notches, means whereby adjacent spiral projections move in unison downwardly and rearwardly, longitudinal grooves in the perimeters of said rolls which extend from the rear end of said spiral projections to the rear end of said rolls, said longitudinal grooves positioned whereby they turn in alternate relation and having a shape to thereby form a substantially uniform zigzag opening through which the stalks are moved downward.

3. In a corn harvester, the combination of a carrying frame, a pair of snapping rolls closely spaced in parallel relation rotatably mounted on said frame, stalk engaging means on said rolls and means whereby adjacent surfaces of said rolls turn downward, gathering chains having stalk engaging lugs positioned over substantially the front half of said rolls and geared to travel at a speed whereby the stalks will be engaged by said lugs and moved rearwardly, a supplemental chain having stalk engaging lugs positioned over substantially the rear half of one of said rolls and geared to travel at less than ground speed whereby the stalks will be retarded in their further travel rearwardly.

4. A corn harvester, the combination of a frame, a pair of snapping rolls closely spaced in parallel relation rotatably mounted on said frame, means whereby adjacent surfaces on said rolls turn downward, stalk engaging spirals on substantially the front half of said rolls adapted to move the stalks rearwardly, notched stalk engaging spirals on substantially the rear half of said rolls adapted to move the stalks rearwardly and downwardly, gathering chains having stalk engaging lugs positioned over substantially the front half of said rolls and geared at a speed to thereby move the stalks rearwardly, a supplemental gathering chain having stalk engaging lugs positioned over substantially the rear half of said rolls and geared at a speed whereby the stalks will be retarded.

5. In a corn harvester, the combination of two supporting bars spaced apart in parallel relation, a pair of snapping rolls closely spaced in parallel relation between said bars, said snapping rolls rotatably mounted near their front ends adjacent said supporting bars by means of an internal bearing and narrow projecting brackets, the portion of said rolls in front of said brackets being substantially cone shape, spiral projections on said rolls of opposite hand to the direction of rotation when viewed from the front end extending rearwardly from the front end of said cone and continuing uniformly in rear of said brackets, the front end of one of said snapping rolls positioned in advance of the other whereby there will be an uninterrupted spiral adjacent said brackets to thereby prevent clogging, means to turn said rolls in opposite directions whereby adjacent surfaces turn downward, said spiral projections for their entire length adapted to turn in unison thereby to cooperate and move the stalks rearwardly.

CHARLES EDWARD EVERETT.
CHARLES H. TAYLOR.